(12) United States Patent
Hazama

(10) Patent No.: US 11,184,540 B2
(45) Date of Patent: Nov. 23, 2021

(54) IMAGE PICKUP APPARATUS WITH A FLEXIBLE PRINTED CIRCUIT BOARD WITH A BENT PORTION

(71) Applicant: CANON KABUSHIKI KAISHA, Tokyo (JP)

(72) Inventor: Hisakazu Hazama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/897,756

(22) Filed: Jun. 10, 2020

(65) Prior Publication Data
US 2020/0393695 A1 Dec. 17, 2020

(30) Foreign Application Priority Data
Jun. 13, 2019 (JP) .............................. JP2019-110112

(51) Int. Cl.
*H04N 5/232* (2006.01)
*H04N 5/353* (2011.01)
*H04N 5/225* (2006.01)

(52) U.S. Cl.
CPC ....... *H04N 5/23258* (2013.01); *H04N 5/2251* (2013.01); *H04N 5/23248* (2013.01); *H04N 5/23267* (2013.01); *H04N 5/23287* (2013.01); *H04N 5/3532* (2013.01)

(58) Field of Classification Search
CPC ............. H04N 5/23258; H04N 5/2251; H04N 5/23248; H04N 5/23267; H04N 5/23287; H04N 5/3532
See application file for complete search history.

(56) References Cited

U.S. PATENT DOCUMENTS

| | | | | |
|---|---|---|---|---|
| 2003/0016300 A1* | 1/2003 | Ting | ..................... | H04N 5/2253 348/335 |
| 2005/0285973 A1* | 12/2005 | Singh | ................... | H04N 5/2253 348/374 |
| 2008/0211922 A1* | 9/2008 | Murashima | .............. | G03B 5/02 348/208.99 |
| 2009/0231450 A1* | 9/2009 | Tanaka | ................... | H04N 5/238 348/208.7 |

FOREIGN PATENT DOCUMENTS

JP 2018-060160 A 4/2018

* cited by examiner

*Primary Examiner* — Nicholas G Giles
(74) *Attorney, Agent, or Firm* — Cowan, Liebowitz & Latman P.C.

(57) ABSTRACT

An image pickup apparatus includes a sensor unit that includes a shake detecting sensor configured to detect an applied shake, a flexible printed circuit board having a sensor mounting part, and a holding member having a first surface configured to hold the sensor mounting part. The sensor unit is disposed in a first direction parallel to a shutter blade moving direction. The first surface and a second surface separated from the first surface in the first direction are provided so as to be orthogonal to the first direction. The flexible printed circuit board has an extending portion extending from the sensor mounting part. The extending portion has a bent portion that is bent in the first direction between the first surface and the second surface so that an extending direction is reversed in a second direction orthogonal to the first direction.

8 Claims, 6 Drawing Sheets

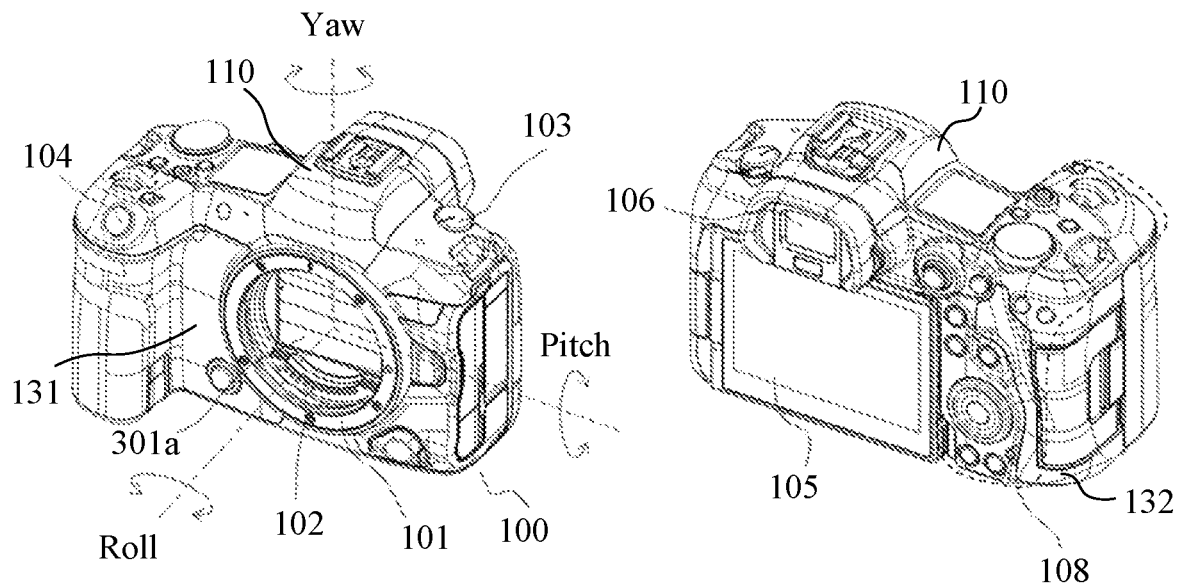
FIG. 2A
FIG. 2B
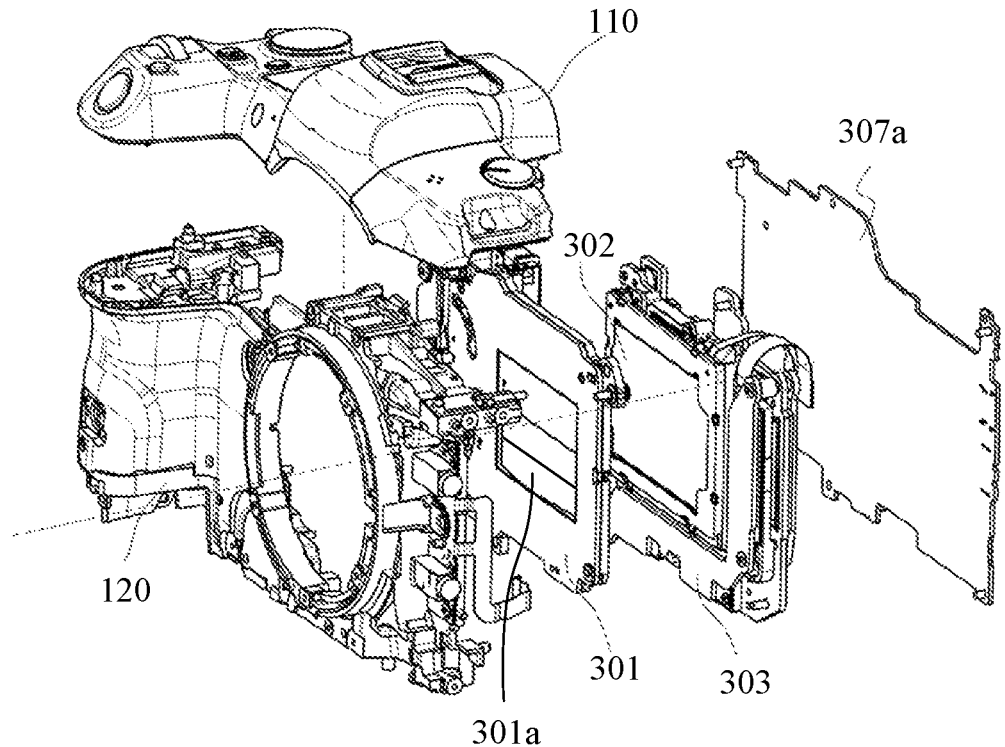
FIG. 3

IMAGE PICKUP APPARATUS WITH A FLEXIBLE PRINTED CIRCUIT BOARD WITH A BENT PORTION

BACKGROUND OF THE INVENTION

Field of the Invention

The present invention relates to an image pickup apparatus having a shake detecting sensor.

Description of the Related Art

An image pickup apparatus having an image stabilizing function stabilizes an image by shifting a lens or an image pickup element (image sensor) according to shakes of an image pickup apparatus detected by a shake detecting sensor, such as a gyro sensor. However, when the vibration is generated by the impact when the shutter operates and the shutter blades collide with a stopper member that stops the shutter during image pickup and transmits to the shake detecting sensor, the erroneous image stabilization is performed.

Japanese Patent Laid-Open No. ("JP") 2018-60160 discloses an image pickup apparatus that sandwiches the shake detecting sensor through buffer members so as to restrain the vibrations from the shutter from transmitting to the shake detecting sensor.

However, the image pickup apparatus disclosed in JP 2018-60160 connects the shake detecting sensor and a control board for controlling the image stabilization and the like via a flexible printed circuit (FPC) board, and the vibration that has transmitted from the shutter to the control board may transmit to the shake detecting sensor via the FPC board.

SUMMARY OF THE INVENTION

The present invention provides an image pickup apparatus that can restrain the vibrations of a shutter from transmitting to a shake detecting sensor via a FPC board.

An image pickup apparatus according to one aspect of the present invention includes a shutter, an electric circuit board, and a sensor unit that includes a shake detecting sensor configured to detect a shake applied to the image pickup apparatus, a flexible printed circuit board having a sensor mounting part on which the shake detecting sensor is mounted, and a holding member having a first surface configured to hold the sensor mounting part, the holding member being fixed into the image pickup apparatus. The sensor unit is disposed in a first direction parallel to a direction in which shutter blades of the shutter move relative to the shutter. In the sensor unit, the first surface and a second surface separated from the first surface in the first direction are provided so as to be orthogonal to the first direction. The flexible printed circuit board has an extending portion extending from the sensor mounting part and connected to the electric circuit board. The extending portion has a bent portion that is bent in the first direction between the first surface and the second surface so that an extending direction is reversed in a second direction orthogonal to the first direction.

Further features of the present invention will become apparent from the following description of exemplary embodiments with reference to the attached drawings.

BRIEF DESCRIPTION OF THE DRAWINGS

FIGS. 2A and 2B are perspective views illustrating the appearance of the camera according to the embodiment.

FIG. 3 is an exploded perspective view of the camera according to the embodiment.

DESCRIPTION OF THE EMBODIMENTS

Figure 1:
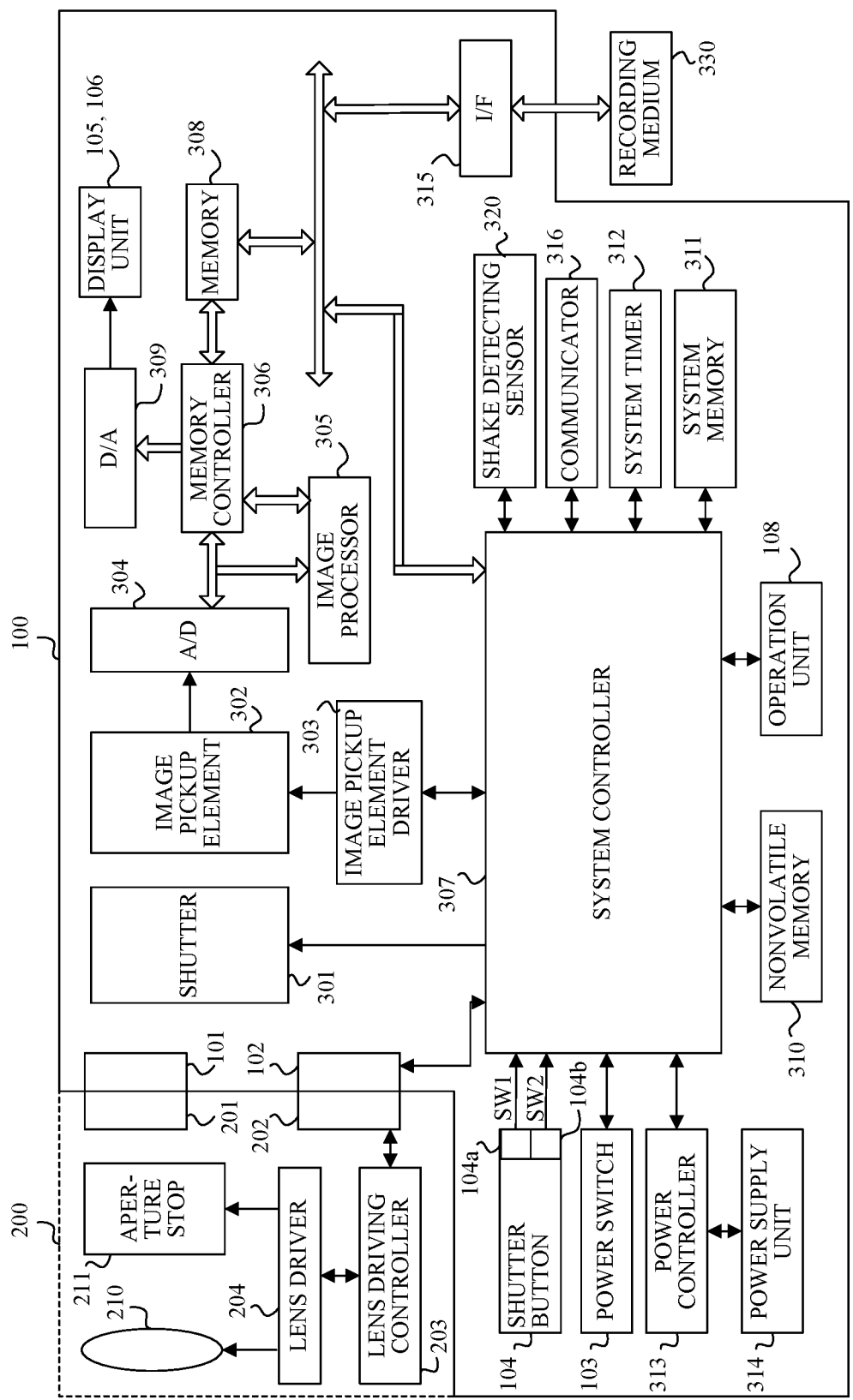
FIG. 1 is a block diagram illustrating a configuration of a camera according to one embodiment of the present invention.

Referring now to the accompanying drawings, a description will be given of embodiments according to the present invention. FIG. 1 illustrates a configuration of a digital camera (simply referred to as a camera hereinafter) 100 as an image pickup apparatus according to one embodiment of the present invention. The camera 100 is an interchangeable lens type camera in which an interchangeable lens unit (simply referred to as a lens unit hereinafter) 200 is detachable, and FIG. 1 also illustrates the configuration of the lens unit 200. FIGS. 2A and 2B illustrate the appearances of the camera 100 viewed from the front side and the rear side. FIG. 3 illustrates an exploded internal structure of the camera 100.

The lens unit 200 is mounted on a mount portion 101 of the camera 100 via a mount 201. The lens unit 200 has an image pickup optical system including a lens 210 and an aperture stop (diaphragm) 211. The lens 210 includes a plurality of lenses such as a magnification varying lens, a focus lens, and an image stabilizing lens. The lens unit 200 includes a lens driver 204 that drives a magnification varying lens or the focus lens in the optical axis direction, shifts the image stabilizing lens in a direction orthogonal to the optical axis, and opens and closes the aperture stop 211. The lens unit 200 includes a lens driving controller 203 that communicates with the camera 100 (system controller 307) via an unillustrated communication terminal provided on a mount connector 202, and controls lens driving and aperture stop driving by the lens driver 204.

The camera 100 includes an image pickup element 302 that photoelectrically converts (captures) an object image formed by imaging light from an image pickup optical system, a mechanical shutter (simply referred to as a shutter hereinafter) 301 that controls an exposure amount of the image pickup element 302. The image pickup element 302 includes a photoelectric conversion element such as a CCD sensor and a CMOS sensor. The shutter 301 is a focal plane shutter disposed in front of the image pickup element 302. In the non-image pickup state, the imaging light directed to the image pickup element 302 is blocked by a plurality of shutter blades 301a illustrated in FIGS. 2A, 2B, and 3, and during image pickup, the shutter blades 301a are opened and the imaging light reaches the image pickup element 302.

An A/D converter 304 converts an analog imaging signal output from the image pickup element 302 into a digital imaging signal. The digital imaging signal is output to an image processor 305 and a memory controller 306. The image processor 305 performs image processing such as pixel interpolation processing, resizing processing, and color conversion processing for the digital imaging signal from the A/D converter 304 or the memory controller 306 to generate the image data. The image processor 305 performs various calculation processing using the image data, and the system controller 307 performs AF (autofocus) processing, AE (auto-exposure) processing, EF (flash pre-emission) processing, and AWB (auto-white balance) processing based on the calculation result.

The memory controller 306 writes the digital imaging signal and the image data generated by the image processor 305 into the memory 308. The memory 308 stores the digital imaging signal and image data. A D/A converter 309 converts the image data stored in the memory 308 into an analog image signal and supplies it to a rear display unit 105 and a viewfinder display unit 106 illustrated in FIG. 2A and 2B. Thereby, the display units 105 and 106 display live-view images and captured images.

A nonvolatile memory 310 includes an EEPROM and the like, and stores constants, programs, and the like used for operations of the system controller 307. The system controller 307 has at least one processor (computer), and controls the entire camera 100 and the lens unit 200. A system memory 311 includes a RAM, and stores constants and variables for operations of the system controller 307, and decompresses and stores programs and the like read out of the nonvolatile memory 310. A system timer 312 measures the time used for various controls and outputs the time ticked by the built-in clock.

A power switch 103 is operated by the user to power on/off the camera 100 and the lens unit 200. A first shutter switch 104a is turned on when the user half-presses the shutter button 104 provided on the top of the camera 100 as illustrated in FIG. 2A and 2B, and generates a first shutter switch signal SW1. The system controller 307 starts operations such as the AF processing, the AE processing, the AWB processing, and the EF processing according to the first shutter switch signal SW1. A second shutter switch 104b is turned on when the user fully presses the shutter button 104, and generates a second shutter switch signal SW2. The system controller 307 drives the shutter 301 to drive the shutter blades 301a in response to the second shutter switch signal SW2, and starts a series of imaging processing from reading out a signal from the image pickup element 302 to writing the image data into a recording medium 330.

An operation unit 108 includes various operation members other than the shutter button 104 described above. The operation unit 108 also includes a touch panel provided on the rear display unit 105. When the operation unit 108 is operated by the user, the system controller 307 performs an operation corresponding to the operation. A power controller 313 supplies the power from a power supply unit 314 such as a secondary battery to each block in the camera 100 or to the lens unit 200 through the mount connector 102. A recording medium I/F 315 is an interface with a recording medium 330 such as a memory card or a hard disk drive. A communicator 316 is connected to the outside by a wireless or wired cable, and transmits and receives a video signal, an audio signal, and the like.

The shake detecting sensor 320 includes a gyro sensor or the like, and detects shake magnitudes in three axes directions or a pitch direction, a yaw direction, and a roll direction in the camera 100 as illustrated in FIG. 2A and 2B. An image pickup element driver 303 shifts the image pickup element 302 relative to the optical axis in accordance with the direction and magnitude of the shake detected by the shake detecting sensor 320 to perform the optical image stabilization. An image processor 305 performs an electronic image stabilization by shifting a cutout area from the image data according to the direction and magnitude of the shake detected by the shake detecting sensor 320.

The image stabilizing lens in the image pickup optical system may be shifted relative to the optical axis in accordance with the direction and magnitude of the shake detected by the shake detecting sensor 320.

In the shutter 301, the shutter blades 301a quickly move from the closed state to the open state in a direction (vertical direction) orthogonal to the optical axis, collide with an unillustrated stopper member provided in the shutter 301, and stop moving. The impact generated by the collision of the shutter blades 301a with the stopper member causes the entire shutter 301 to vibrate in the same vertical direction as the moving direction of the shutter blades 301a. The vibration of the shutter 301 propagates to a main chassis 120 as a baseplate to which the shutter 301 is fastened by screws as illustrated in FIG. 3, to a control board 307a serving as an electric circuit board fixed onto the main chassis 120 by screws, and finally to the top cover unit 110 which is fixed onto the tops of the main chassis 120 by screws. The system controller 307, the image processor 305, the memory controller 306, the communicator 316, and the like are mounted on the control board 307a.

The main chassis 120 has a structure that secures the strength of the camera 100. As described above, the shutter 301 and the control board 307a are screwed onto the main chassis 120, and the image pickup element driver 303 that holds the image pickup element 302 and is disposed between the shutter 301 and the control board 307a is also screwed onto it. As illustrated in FIGS. 2A and 2B, the front side of the main chassis 120 is covered with a front cover 131, and the rear side of the control board 307a fixed to the main chassis 120 is covered with a rear cover 132. Both the front cover 131 and the rear cover 132 are screwed onto main chassis 120.

Figure 4B:
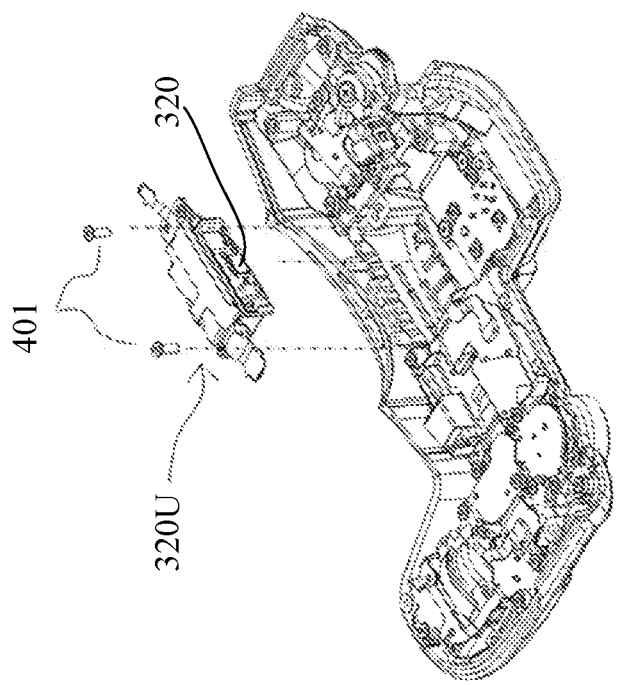
FIG. 4 is a perspective view illustrating an internal structure of a top cover unit of the camera according to the embodiment.
Figure 4A:
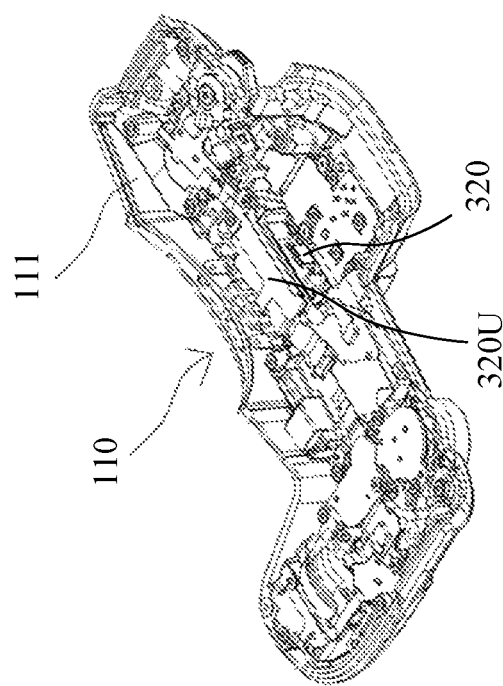

FIG. 4 illustrates the internal structure of the top cover unit 110. The top cover unit 110 includes a top cover member 111 fixed onto the main chassis 120 with screws, the power switch 103, the shutter button 104, and the like. A sensor unit 320U including the shake detecting sensor 320 is fixed at the center of the rear side of the top cover member 111 by screws 401. The sensor unit 320U is disposed on the shutter 301 in an upward direction (first direction) parallel to the moving direction of the shutter blades 301a of the shutter 301.

Figures 5A, 5B, 5C:
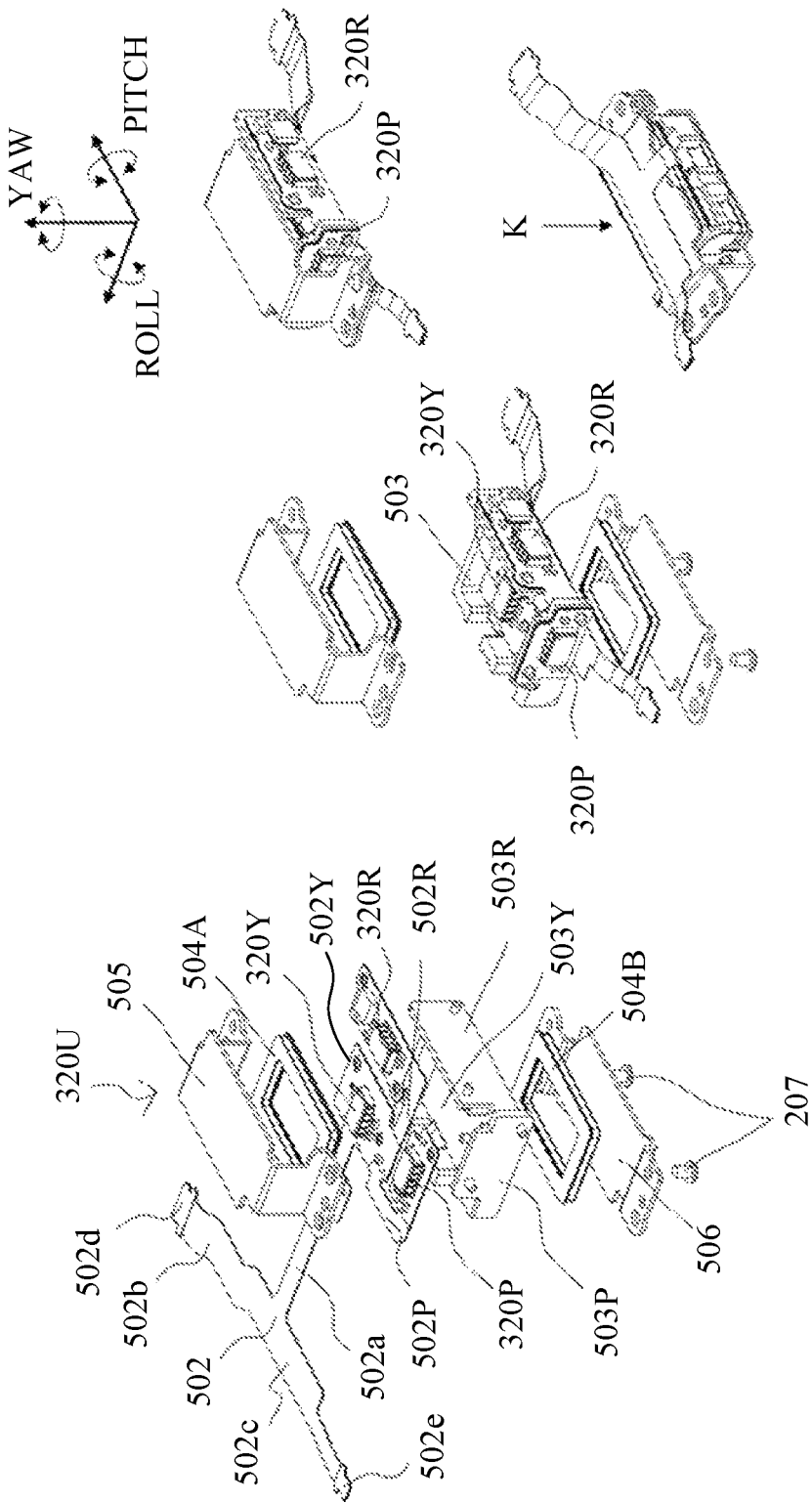
FIGS. 5A to 5C are exploded perspective views of a shake detector of the camera according to the embodiment.

FIG. 5A illustrates the disassembled sensor unit 320U viewed from above in the camera 100. The sensor unit 320U includes a yaw sensor 320Y, a roll sensor 320R, and a pitch sensor (also collectively and simply referred to as a sensor hereinafter) 320P each serving as the above shake detecting sensor 320, and these sensors 320Y, 320R, and 320P are mounted on a sensor flexible printed circuit (FPC) board 502. The yaw sensor 320Y detects shakes in the yaw direction, the roll sensor 320R detects shakes in the roll direction, and the pitch sensor 320P detects shakes in the pitch direction, and each outputs a shake signal according to the magnitude of the shake.

A holding member 503 is a member configured to hold the sensors 320Y, 320R, and 320P mounted on the sensor FPC board 502 in place, and formed of a material such as plastic. The holding member 503 includes a yaw holding surface (first surface) 503Y orthogonal to the rotational center axis in the yaw direction, a roll holding surface 503R orthogonal to the rotational center axis in the roll direction, and a pitch holding surface (third surface) 503P orthogonal to a rotational center axis in the pitch direction. In other words, the yaw holding surface 503Y is a surface orthogonal to the vertical direction (first direction) that is the moving direction of the shutter blades 301a, and the roll holding surface 503R and the pitch holding surface 503P are surfaces parallel to the vertical direction.

As illustrated in FIG. 5B, a sensor mounting part 502Y mounted with the yaw sensor 320Y of the sensor FPC board 502 is held by the yaw holding surface 503Y so that the yaw sensor 320Y is parallel to the yaw holding surface 503Y. A sensor mounting part 502R mounted with the roll sensor 320R and a sensor mounting part 502P mounted with the pitch sensor 320P are bent relative to the sensor mounting parting portion 502Y in the sensor FPC board 502, and held by the holding surfaces 503R and 503P so that the roll sensor 320R is parallel to the roll holding surface 503R and the pitch sensor 320P is parallel to the pitch holding surface 503P.

The holding member 503 and the sensor FPC board 502 are firmly fixed near the sensors 320Y, 320R, and 320P by a double-sided adhesive tape, an adhesive, a screw, or the like so that the position of each sensor does not change relative to the holding member 503. The buffer member 504 is made of an elastic material such as a sponge that absorbs the vibrations.

Figures 6A, 6B:
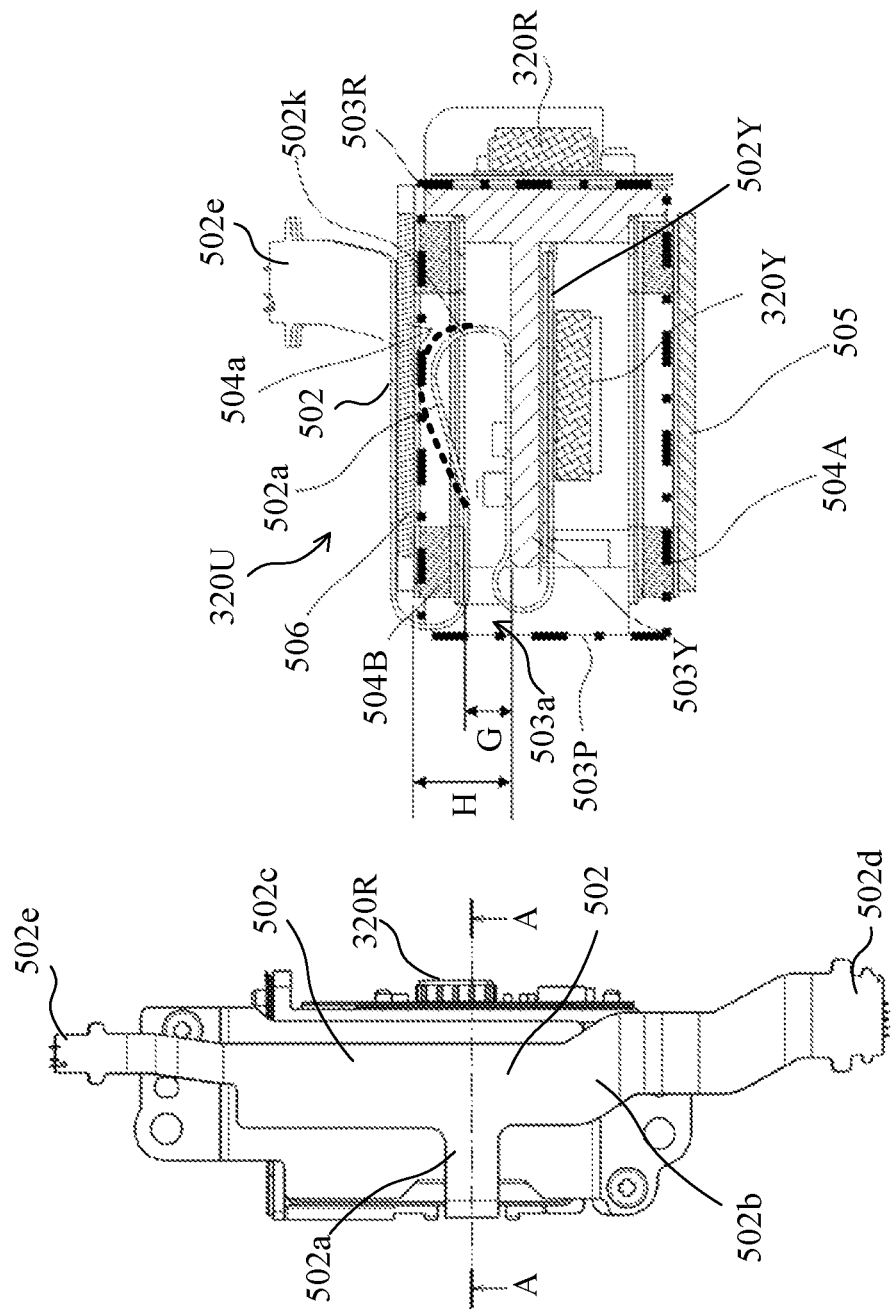
FIGS. 6A and 6B are sectional views of an extending portion provided in the shake detector.

FIGS. 5C and 6A illustrate the assembled sensor unit 320U. FIG. 6A illustrates the sensor unit 320U viewed from an arrow K direction in FIG. 5C (which is a direction on the lower side in the camera 100). FIG. 6B illustrates a section when the sensor unit 320U is severed along the line A-A in FIG. 6A.

A buffer or cushioning member 504A illustrated in FIGS. 5A, 5B, and 6B is disposed parallel to the yaw sensor 320Y between the sensor mounting part 502Y of the sensor FPC board 502 held by the holding member 503 and a first fixed plate 505. A buffer member 504B is disposed parallel to the yaw sensor 320Y between the holding member 503 and a plane portion (second surface) of a second fixed plate (fixing member) 506 disposed on the opposite side of the first fixed plate 505 with respect to the holding member 503. The first and second fixed plates 505 and 506 are fixed to each other by screws 507, and sandwich (hold) the holding member 503 and the buffer members 504A and 504B. The first and second fixed plates 505 and 506 are fixed to the top cover member 111 by screws 401 as illustrated in FIG. 4.

An extending portion 502a extends from the sensor mounting part 502Y of the sensor FPC board 502, and extending portions 502b and 502c extend in different (opposite) directions from the tip of extending portion 502a. Connection terminals 502d and 502e that are connected to connectors provided on an unillustrated main FPC board that extends from the control board 307a are provided at the ends of the extending portions 502b and 502c. The shake signals output from the sensors 320Y, 320R, and 320P are sent to the system controller 307 via the connection terminals 502d and 502e and the main FPC board.

As illustrated in FIG. 6B, the extending portion 502a is bent in a U or C shape to the downward direction (although it is the up direction in FIG. 6B) so that its extending direction is reversed in a longitudinal (front-back) direction (second direction) orthogonal to the vertical (up-down) direction from the front surface to the rear surface of the yaw holding surface 503Y that holds the sensor mounting part 502Y, and then extends along the rear surface. The extending portion 502a is bent in the downward direction in a C shape to form a bent portion 502k between the rear surface of the yaw holding surface 503Y and the plane portion of the second fixed plate 506 so that the extending direction is reversed in the longitudinal direction. The extending portion 502a extending from the bent portion 502k extends through an opening 503a provided between the yaw holding surface 503Y of the holding member 503 and the buffer member 504B, is bent in a U shape so that the extending direction is reversed in the longitudinal direction, and extends along the bottom surface (outer surface) of the plane portion of the second fixed plate 506.

The extending portion 502a that is bent at two locations before extending from the opening 503a is located within a projection area where the pitch holding surface (third surface) 503P indicated by an alternate long and short dash line in FIG. 6B is projected in a direction orthogonal to it. This prevents the sensor unit 320U from becoming large in the vertical direction. Portions on the proximal ends of the extending portions 502b and 502c extending from the extending portion 502a are fixed onto the outer surface of the second fixed plate 506 by a double-sided tape, adhesive, or the like.

Herein, the bending direction of the bent portion 502k is the same as the vertical direction which is the moving direction of the shutter blades 301a. The vibration generated by the shutter 301 propagates to the extending portion 502a via the main chassis 120, the control board 307a, the main FPC board, and the connection terminals 502d and 502e of the sensor FPC board 502. The vibration propagated to the extending portion 502a propagates to the bent portion 502k, but the bent portion 502k is deformed as illustrated by a dotted line in FIG. 6B and serves as a spring, so that the propagated vibration is attenuated. Therefore, this embodiment can restrain the sensors 320Y, 320R, and 320P from erroneously detecting the vibration generated from the shutter 301, and from making an erroneous detection in response to the shake signal erroneously output from any of the sensors.

In order to improve the vibration attenuation performance of the bent portion 502k, the extending portion 502a may be maintained as long as possible and the bent portion 502k may be made higher in the bending direction. Accordingly, this embodiment forms a hole 504a as a space in the buffer member 504, and also disposes part of the bent portion 502k in the hole 504a. Thereby, the height of the space that can house the bent portion 502k can be increased from G to H.

Figure 7:
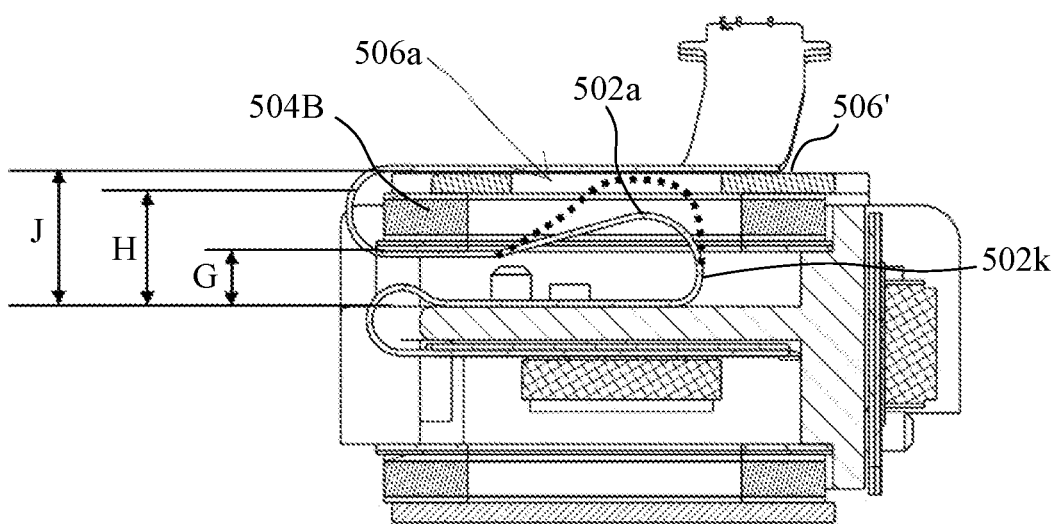
FIG. 7 is another sectional view of the extending portion.

In order to further improve the vibration attenuation performance of the bent portion 502k, a hole 506a is also formed as a space in the second fixed plate 506, as illustrated in FIG. 7, and may locate part of the bent portion 502k in the hole 506a. Thereby, the height of the space that can house the bent portion 502k can be increased from H to J. In this case, the outer surface of the second fixed plate 506 or the sensor FPC board 502 fixed to the outer surface corresponds to the second surface.

While this embodiment has described the interchangeable lens type camera, a lens integrated camera is also included in other embodiments of the present invention.

The above embodiment can restrain the vibration of the shutter from propagating to the shake detecting sensor via the FPC board.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-110112, filed on Jun. 13, 2019, which is hereby incorporated by reference herein in its entirety.

What is claimed is:

1. An image pickup apparatus comprising:
    a shutter;
    an electric circuit board; and
    a sensor unit that includes:
        a shake detecting sensor configured to detect a shake applied to the image pickup apparatus;
        a flexible printed circuit board having a sensor mounting part on which the shake detecting sensor is mounted; and
        a holding member having a first surface configured to hold the sensor mounting part, the holding member being fixed into the image pickup apparatus,
    wherein the sensor unit is disposed in a first direction parallel to a direction in which shutter blades of the shutter move relative to the shutter,
    wherein in the sensor unit, the first surface and a second surface separated from the first surface in the first direction are provided so as to be orthogonal to the first direction,
    wherein the flexible printed circuit board has an extending portion extending from the sensor mounting part and connected to the electric circuit board, and
    wherein the extending portion has a bent portion that is bent in the first direction between the first surface and the second surface so that an extending direction is reversed in a second direction orthogonal to the first direction.

2. The image pickup apparatus according to claim 1, wherein a buffer member made of an elastic material is disposed between the first surface and the second surface.

3. The image pickup apparatus according to claim 2, wherein the buffer member forms a space configured to house part of the bent portion.

4. The image pickup apparatus according to claim 1, wherein the sensor unit includes a fixed member that holds the holding member and is fixed in the image pickup apparatus, and
    wherein the fixed member has the second surface.

5. The image pickup apparatus according to claim 4, wherein the fixed member forms a space configured to house part of the bent portion.

6. The image pickup apparatus according to claim 1, wherein the sensor unit has another shake detecting sensor configured to detect a shake in a different direction from that of the shake detecting sensor,
    wherein the holding member has a third surface parallel to the first direction and configured to hold the other shake detecting sensor, and
    wherein the bent portion is disposed in an area where the third surface is projected in a direction orthogonal to the third surface.

7. The image pickup apparatus according to claim 1, further comprising a driver configured to shift, relative to the optical axis, an image pickup element configured to image an object image or a lens configured to form the object image on the image pickup element using an output from the shake detecting sensor.

8. The image pickup apparatus according to claim 1, further comprising an image processor configured to shift a cutout area of image data generated by an output from an image pickup element configured to image an object image, using an output from the shake detecting sensor.

* * * * *